May 9, 1967 A. SCHIKS 3,318,215

FLASH-EXPOSURE STRUCTURE FOR CAMERAS

Original Filed Nov. 23, 1962 3 Sheets-Sheet 1

INVENTOR.
ALBART SCHIKS
BY Michael S. Striker
Attorney

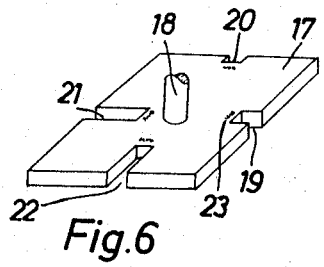
Fig.6
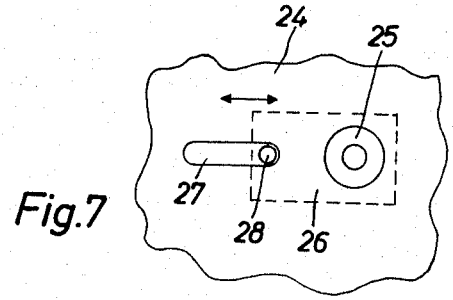
Fig.7
Fig.8
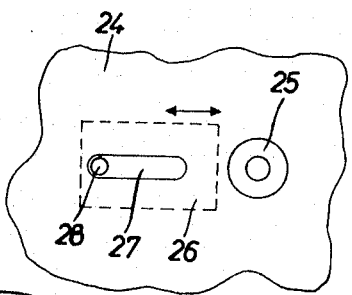
Fig.9
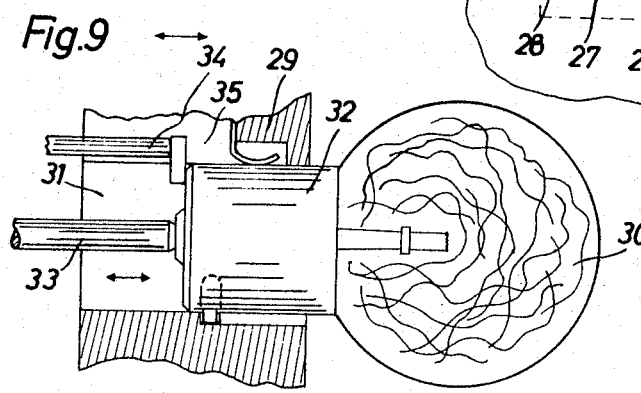
Fig.10
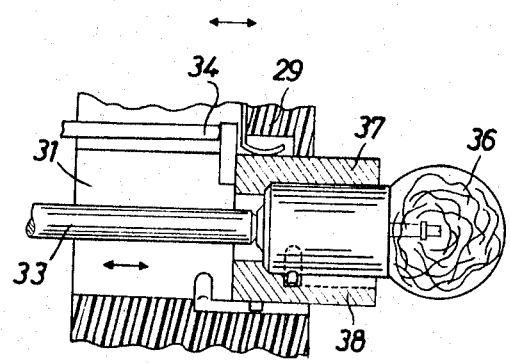

May 9, 1967 A. SCHIKS 3,318,215
FLASH-EXPOSURE STRUCTURE FOR CAMERAS
Original Filed Nov. 23, 1962 3 Sheets-Sheet 3

INVENTOR.
ALBART SCHIKS
BY Michael S. Striker
Attorney

United States Patent Office 3,318,215
Patented May 9, 1967

3,318,215
FLASH-EXPOSURE STRUCTURE FOR CAMERAS
Albart Schiks, Munich-Obermenzing, Germany, assignor to Agfa Aktiengesellschaft, Leverkusen-Bayerwerk, Germany
Continuation of application Ser. No. 239,573, Nov. 23, 1962. This application Mar. 23, 1966, Ser. No. 536,926
26 Claims. (Cl. 95—11.5)

The present application is a continuation of my application Ser. No. 239,573, entitled, "Flash-Exposure Structure for Cameras," filed Nov. 23, 1962.

The present invention relates to cameras.

More particularly, the present invention relates to cameras capable of making exposures with flash illumination.

With cameras of this type it is necessary to provide certain camera settings in order to make a proper exposure with flash illumination. Thus, such settings are required not only to make a proper exposure of a given subject which is at a certain distance from the camera with flash illumination but also for the purpose of synchronizing the flash illumination with the shutter so that the illumination provided by the flash will take place when the shutter is open. Very often the operator of the camera will neglect to provide proper camera settings required for an exposure with flash illumination, so that improper exposures are made under such circumstances.

A primary object of the present invention is to provide for a camera of the above type a structure which will determine the proper setting of the camera, at least in part, for an exposure with flash illumination, and in accordance with the invention the determination of the proper setting of the camera will take place either by a structure which reminds the operator that he must make certain settings when using flash illumination or by automatically setting the camera to make a proper exposure with flash illumination.

A further object of the present invention is to provide a structure of the above type which will operate in response to mounting on the camera of a structure associated with the making of an exposure with flash illumination, such structure being either the insertion of a flash bulb into a suitable receptacle, the insertion of a part of a cable into a suitable receptacle, or even the insertion of a foot of a flash assembly into a shoe which is carried by the camera.

It is furthermore an object of the present invention to provide a structure of the above type which enables the operator to vary the particular camera settings in accordance with a variable such as the particular characteristics of a given flash bulb which is used to make the exposure.

It is furthermore an object of the present invention to provide a structure of the above type which is extremely simple to operate and which is also simple and reliable in its construction.

With these objects in view the invention includes, in a camera, a receiving means for receiving at least part of a structure for making an exposure with flash illumination. A determining means cooperates with the receiving means for determining at least in part the proper setting of the camera for making an exposure with flash illumination. In accordance with the invention this determining means is movable and is compelled by the receiivng means to assume a predetermined position before the receiving means can receive a part of the structure for making an exposure with flash illumination, and the determining means when in this predetermined position determines at least in part the setting of the camera required to make an exposure with flash illumination. The determining means when in this predetermined position determines at least in part the camera setting required for making an exposure with flash illumination either by reminding the operator to make certain camera settings or by automatically actuating camera structure to make such settings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 6 is a perspective view of another embodiment of a foot of a flash assembly;

FIG. 7 is a framentary illustration of a further embodiment of a structure according to the present invention;

FIG. 8 shows the structure of FIG. 7 in a position different from that shown in FIG. 7;

Figure 11:
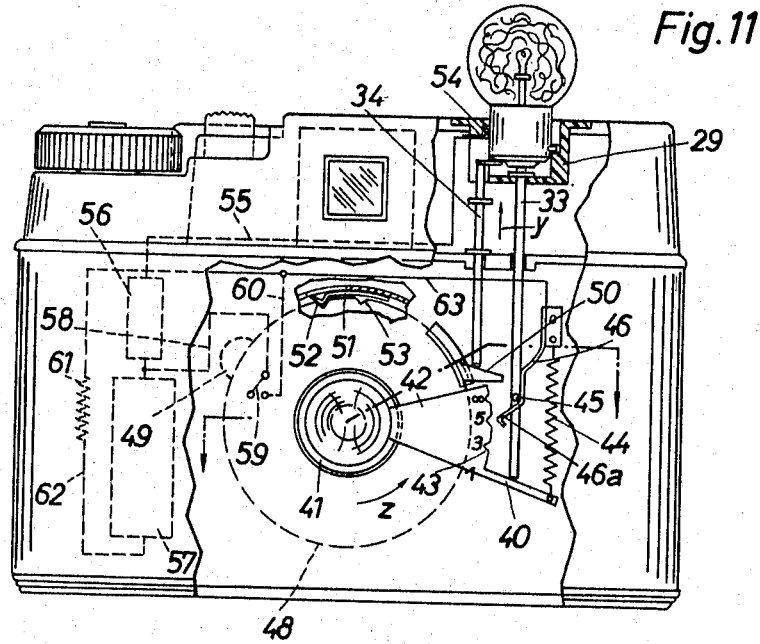
Figure 12:
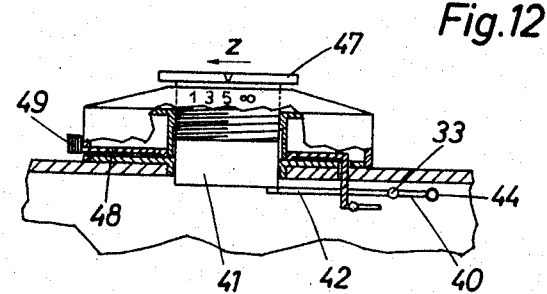

FIG. 9 fragmentarily illustrates a receptacle for receiving a flash bulb as well as structure which cooperates with flash bulbs for determining camera settings;

FIG. 10 shows how the structure of FIG. 9 is capable of cooperating with a flash bulb different from that of FIG. 9;

FIG. 11 shows the structure of FIG. 9 in its environment in a camera, and FIG. 11 in addition shows structure which cooperates with the elements shown in FIG. 9; and FIG. 12 is a fragmentary sectional plan view taken along line 12—12 of FIG. 11 in the direction of the arrows.

Figure 1:
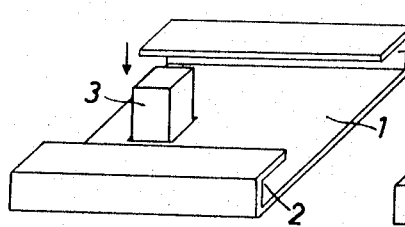
FIG. 1 is a perspective illustration of a shoe which cooperates with a structure for determining a camera setting when an exposure is to be made with flash illumination.

Referring to the drawings and to FIG. 1 in particular, it will be seen that there is shown in FIG. 1 a shoe 1 which is carried by a camera and which is adapted to receive a foot which matingly slides into the shoe 1 in the manner well known in the art and which is located at the lower part of a flash assembly, as is also well known in the art. Thus, the side edge portions of the foot are adapted to be received in the side channel portions 2 of the shoe 1. Thus, the shoe 1 forms a receiving means for receiving a part of the structure for providing an exposure with flash illumination. The shoe 1 differs from conventional shoes in that it is formed with an opening through which a blocking member 3 projects, as indicated in FIG. 1. The elongated blocking member 3 is guided for vertical movement through the opening in the bottom wall of the shoe 1 shown in FIG. 1, and it will be noted that the blocking member 3 is located in the path of movement of a foot into the shoe of FIG. 1, so that as long as the blocking member 3 is in the position illustrated in FIG. 1 the operator cannot mount the flash assembly on the camera. In order to mount the flash assembly on the camera it is necessary for the operator first to depress the movable blocking member 3 downwardly in the direction of the arrow shown in FIG. 1 so as to enable in this way the foot to be moved fully into the shoe 1. The movable element 3 can be operatively connected to structure of the camera which at least in part determines the setting thereof for making a proper exposure with flash illumination, so that when the member 3 is depressed in order to permit the foot to be received in the shoe the camera will be automatically set at least in part to make a proper exposure with flash illumination, and the manner in which the movable member 3 can accomplish this result is referred to below. However, it is also possible for the member 3 to determine the setting of the camera at least in part for making a proper exposure with flash illumination by reminding the operator to set the camera properly, and in either of these cases it is clear that the member 3 forms a determining means for determining at least in part the camera setting required for a proper exposure with flash illumination, and this determining means formed by the member 3 is movable and is compelled by the receiving means 1 receives when the receiving means 1 receives the foot to assume a predetermined position where the determining means 3 determines at least in part the setting of the camera required for making a proper exposure with flash illumination. For example, the depression of the member 3 to the extent required to enable the foot to be completely received in the shoe 1 may be used for automatically setting the exposure time of the camera.

Figure 2:
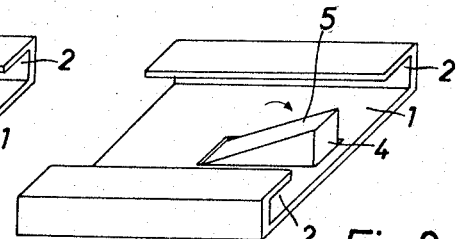
FIG. 2 is a perspective view of a further embodiment of a structure of the type shown in FIG. 1.
Figure 3:
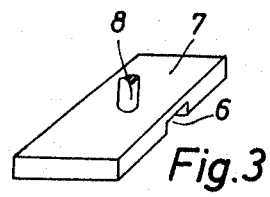
FIG. 3 is a perspective illustration of a foot of a flash assembly, the foot of FIG. 3 being adapted to cooperate with the structure shown in FIG. 2.

In the example of the invention which is illustrated in FIG. 2 the receiving means formed by the shoe 1 has a somewhat longer opening into which a member 4 projects, this member 4 forming the determining means of FIG. 2. The member 4 in this case is turnably mounted and presents an upper surface 5 which is inclined as illustrated in FIG. 2. The foot 7 shown in FIG. 3 is fixed by a pin 8 to the remainder of the flash assembly which is not illustrated, and this foot 7 is formed at its underside with a groove 6 which receives the member 4 of FIG. 2 when the foot 7 is moved into the shoe 1 of FIG. 2. The sliding of the foot 7 into the shoe 1 of FIG. 2 causes the horizontal surface of the groove 6 at the underside of the shoe 7 to engage the slanted surface 5 of the member 4 and to turn the member 4 in the direction of the arrow shown in FIG. 2 so that when the foot 7 is in the shoe 1 of FIG. 2 the member 4 is necessarily in a predetermined position which will automatically provide a given setting of the exposure time, for example, or which will indicate to the operator that it is necessary to provide a certain setting.

It should be noted that the depth of the groove 6 can be chosen so as to provide a given position for the member 4 of FIG. 2 when the foot 7 is in the shoe 1 of FIG. 2, and this will result, for example, in the automatic provision of a specific camera setting such as its exposure time. Thus, in the case of FIGS. 2 and 3 also it is clear that the shoe 1 forms a receiving means while the member 4 forms a movable determining means which is compelled to assume a predetermined position when the receiving means 1 receives the foot 7 so that the determining means 4 by being placed in this predetermined position will determine at least in part the proper setting of the camera to provide an exposure with flash illumination.

Figure 4:
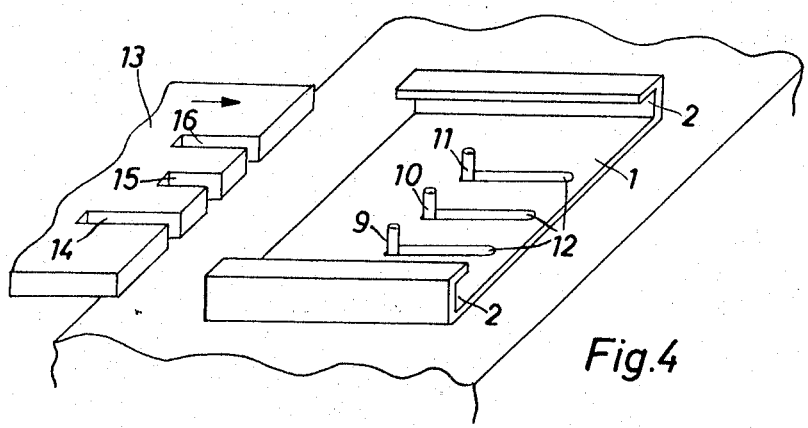
FIG. 4 is a fragmentary perspective illustration of another embodiment of a foot and shoe construction with elements for determining camera settings.
Figure 5:
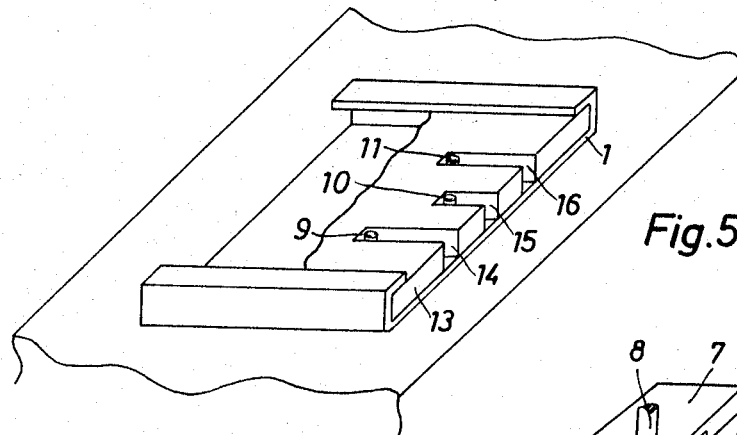
FIG. 5 shows the structure of FIG. 4 in a position different from that shown in FIG. 4.

In the embodiment of the invention which is illustrated in FIGS. 4 and 5, the parts cooperate in a manner similar to a key and lock. In this case the shoe 1 which is carried by the camera is formed with a plurality of elongated slots 12 which extend in the direction which the foot 13 is moved when the foot is inserted into the shoe 1 with the side edges of the foot slidably received in the side channel portions 2 of the shoe 1 shown in FIGS. 4 and 5. Pins 9, 10 and 11 respectively project upwardly through the slots 12 formed in the shoe 1, and these pins also extend through slots formed in the wall of the camera housing which carries the shoe 1, and the horizontal movement of the pins 9–11 respectively along the slots 12 automatically actuates structure of the camera which sets the latter to provide an exposure which will be proper for flash illumination. The foot 13 which is only fragmentarily illustrated is formed at its edge which is directed toward the pins 9–11 with elongated notches 14–16 of different lengths, and these notches are respectively aligned with the slots 12 so as to receive therein the pins 9–11. Thus, the structure resembles a key and lock arrangement. When the foot 13 is moved in the direction of the arrow shown in FIG. 4 into the shoe 1, the pins 9–11 will be received in the notches 14–16 and the continued movement of the foot 13 into the shoe 1 will place the inner ends of the notches 14–16 in engagement with the pins 9–11. The continued movement of the foot 13 into the shoe 1 until the foot 13 becomes located in its final position shown in FIG. 5 will cause the inner ends of the notches 14–16 to move the pins 9–11 respectively along the slots 12 so that these pins will assume the positions indicated in FIG. 5. These pins 9–11 are operatively connected to the camera structure which sets, for example, the exposure time, the aperture, and the distance between the subject and the camera, so that with this construction all of these settings will be automatically made upon introduction of the foot 13 into the shoe 1. Thus, in the embodiment of FIGS. 4 and 5 also the shoe 1 forms a receiving means for receiving a part of the structure for making an exposure with flash illumination, and the pins 9–11 form a determining means which is movable and which necessarily assumes a predetermined position when the foot 13 is received in the receiving means 1, so that the determining means 9–11 can in this way determine automatically the camera setting required to make a proper exposure with the light derived from flash illumination.

While variations are possible in the arrangement shown in FIGS. 4 and 5, in all cases the slots, grooves, or the like of the foot 13 will cooperate with a movable element which is moved during insertion of the foot 13 into the shoe 1 for determining at least in part the setting of the camera required for a proper exposure with flash illumination.

According to the embodiment of the invention which is illustrated in FIG. 6 the foot 17 is turnably carried by the pin 18 which is fixed to the underside of the flash assembly. The several side edges of the foot 17 are respectively formed with notches 19–22 which are of different lengths, and the foot 17 is adapted to cooperate with a shoe similar to that of FIGS. 4 and 5 but provided with only one pin movable along a single slot. Thus, by turning the foot 17 with respect to the shaft 18 it is possible to present to the pin which projects into the shoe a selected one of the notches 19–22, so that in accordance with the selected notch the pin which projects into the shoe will be placed in a predetermined position when the foot is received in the shoe. The foot 17 carries at its upper face in alignment with the inner ends of the notches 19–22 symbols 23 indicating, for example, characteristics of different flash lamps, so that in accordance with the particular type of flash lamp which is to be used the operator will select a corresponding notch and place it in a position to actuate the pin projecting into the shoe so that in this way the setting will be automatically made in accordance with a selected variable such as the type of flash lamp.

According to the embodiment of the invention which is illustrated in FIGS. 7 and 8, the receiving means, instead of being in the form of a shoe, is in the form of a wall portion 24 of the camera which is formed with an opening 25 forming a connection for an end of an electrical cable of the flash assembly. Behind the wall 24 is located a plate 26 which in the position of FIG. 7 extends across the opening 25 so as to prevent the cable from being inserted into this opening and thus in this way it will not be possible for the operator to connect the cable to the camera with the position of the parts shown in FIG. 7. The plate 26 fixedly carries a pin 28 which projects through an elongated slot 27 formed in the wall 24, and the plate 26 cooperates with any suitable guides at the rear of the wall 24 so as to be guided for shifting movement between the positions indicated in FIGS. 7 and 8. Thus, by grasping the pin 28 the operator can shift the plate 26, as indicated by the double-headed arrows in FIGS. 7 and 8 between the positions indicated in FIGS. 7 and 8, and it will be noted that when the operator shifts the plate 26 from the position of FIG. 7 to that of FIG. 8 the plate 26 will be displaced from the opening 25 so that in the position of FIG. 8 the operator can indeed connect the cable to the camera. In this case also the shifting of the plate 26 from the position of FIG. 7 to that of FIG. 8 can be used for automatically setting at least in part the camera to make a proper exposure with flash illumination or in this case also the necessity of movement of the plate 26 from the position of FIG. 7 to that of FIG. 8 can be used simply to remind the operator that it is necessary to make certain settings required for flash illumination. Thus, in the case of FIGS. 7 and 8 also the wall 24 with its opening 25 forms a receiving means for receiving a part of the camera structure used for making an exposure with flash illumination, and the shiftable plate 26 forms a movable determining means which determines at least in part the setting of the camera, either by reminding the operator to make certain settings or by actually making certain settings automatically, and it is apparent from FIGS. 7 and 8 that the movable determining means 26 is compelled by the receiving means 24, 25 to assume a predetermined position shown in FIG. 8 when the receiving means 24, 25 receives the cable.

FIGS. 9 and 10 illustrate part of the structure of a camera which has a built-in flash assembly forming a permanent part of the camera. Thus, in the case of FIGS. 9 and 10 a portion of the camera forms the receptacle 29 for receiving the flash bulb 30 in the case of FIG. 9, and thus the receptacle 29 of FIG. 9 forms a receiving means for receiving part of the structure for making an exposure with flash illumination. As is apparent from FIG. 9 the receptacle 29 is formed with a bayonet slot which receives a pin fixed to and projecting from the base 32 of the lamp 30, so that in this way the lamp 30 may be removably connected into the receptacle 29. As is indicated at the upper right hand portion of FIG. 9 there is also located in the receptacle 29 a leaf spring which engages the exterior surface of the base 32 for forming part of the electrical circuit for igniting the flash lamp 30. The electrical circuit also includes an elongated rod 33 which is supported for axial shifting movement as indicated by the double-headed arrow shown in FIG. 9 and which engages the electrical element at the rear end of the lamp 30, in the manner shown in FIG. 9, so that when the lamp 30 is introduced into the receptacle 29 the rod 33 which is spring-urged to the right, as viewed in FIG. 9, will necessarily be displaced to the left and will assume a predetermined position, this positioning of the rod 33 resulting in automatic setting of the camera in a manner described below. In addition, there is also an elongated rod 34 guided for axial movement and engaged by the lamp 30 so as to be placed in a predetermined position by the lamp 30 when the latter is introduced into the receptacle 29, and thus with the structure of FIG. 9 the rods 33 and 34 are automatically placed in predetermined positions for determining automatically the setting of the camera, at least in part, whenever a bulb 30 is introduced into the receptacle 29. Therefore, in the case of FIG. 9 also the camera is provided with a receiving means 29 for receiving a part of the structure for providing an exposure with flash illumination, and the elements 33 and 34 form a determining means for determining at least in part the setting of the camera required for making an exposure with flash illumination, and it is also clear that the determining means 33, 34 is movable and necessarily assumes a predetermined position when the receiving means 29 receives the lamp 30, as indicated in FIG. 9.

It will be noted from FIGS. 9 and 10 that the rod 33 is located in the hollow interior 31 of the receptacle 29 while the rod 34 is located in an elongated notch or slot 35 formed in the receptacle 29, this notch or slot 35 forming a guide for the elongated rod 34.

The structure of FIG. 10 is identical with that of FIG. 9 except that FIG. 10 illustrates how a flash lamp 36 considerably smaller than the lamp 30 is capable of being used with the construction of the invention. In this case an adapter means 37 is interposed between the lamp and the receptacle 29. The adapter means 37 is in the form of a tube which is formed with a bayonet slot for removably holding the lamp 36 in the illustrated position in the adapter 37, and this adapter 37 itself is electrically conductive and carries a pin which is received in the bayonet slot of the receptacle 29. The adapter 37 is shown in FIG. 10 carrying the lamp 36 and introduced part of the way into the receptacle 29. When the adapter 37 is all the way in the receptacle 29 it will have the position of the base 32 of the lamp 30 shown in FIG. 9. It will be noted that because of the tubular construction of the adapter 37 the rod 33 extends into the adapter for engaging the inner end of the lamp 36 and making electrical contact therewith. Thus, with the construction of FIG. 10 while the rod 34 may assume the same position as the rod 34 of FIG. 9 when the adapter 37 has been introduced all the way into the receptacle 29, the rod 33 will, on the other hand, have a different position from that shown in FIG. 9 since the rod 33 engages the lamp 36 at a point which is displaced to the right from the point of engagement between the rod 33 and the lamp 30 shown in FIG. 9, so that the different construction of the lamp shown in FIG. 10 will necessarily locate the rod 33 in a different position providing a different setting which is required in accordance with the particular characteristics of the lamp 36 of FIG. 10.

Of course, it is also possible to provide for the rod 34 a position different from that of FIG. 9 simply by choosing an appropriate length for the adapter 37 particularly at the portion thereof which engages the rod 34.

FIGS. 11 and 12 illustrate the environment in which the structure of FIGS. 9 and 10 is located. As may be seen from FIG. 11 the receptacle 29 is located at the upper part of the camera illustrated in FIG. 11, and the end of the rod 33 distant from the receptacle 29 engages an extension 40 which is fixed to the focusing member 41 which is supported for rotation about the optical axis and which determines the setting of the objective in accordance with the distance between the subject and the camera. Thus, the introduction of the lamp into the receptacle 29 will cause the rod 33 to be displaced downwardly so that the bottom end of the rod 33 will engage and turn the extension 40 together with the focusing means 41 in a clockwise direction, as viewed in FIG. 11, and thus the camera will automatically be provided with a given distance setting in accordance with the characteristics of the lamp. As may be seen from FIG. 11, there is connected to the rotary distance-setting means 41 a plate 42 located in a plane normal to the optical axis and carrying the extension 40, and the outer edge of the sector-shaped plate 42 is formed with a series of notches 43 forming part of a releasable detent structure for releasably holding the rotary focusing means 41 in given angular positions. The outer end of the extension 40 is fixed to one end of a spring 44 whose opposite end is connected to a stationary part of the camera, so that the spring 44 urges the extension 40 as well as the rotary focusing means 41 and the plate 42 between the extension 40 and the focusing means 41 to turn in the direction of the arrow Z of FIG. 11, and thus the spring 44 acts to urge the rod 33 upwardly in the direction of the arrow y shown in FIG. 11. Therefore, whenever the operator introduces a lamp into the receptacle 29 the rod 33 is displaced by the lamp in opposition to the spring 44 to a position which is determined by the characteristics of the lamp. When there is no lamp in the receptacle 29 the spring 44 will locate the focusing means 41 in a position providing a setting of 1 meter as the distance between the subject and the camera, and of course the rod 33 will also assume a certain position at this time. The rod 33 carries a pin 45 which displaces a leaf spring 46 to the position shown in FIG. 11 when the rod 33 is moved in opposition to the spring 44 in a direction opposite to that indicated by the arrow y upon introduction of a flash lamp into the receptacle 29. However, when the rod 33 is displaced in the direction of the arrow y upon removal of a lamp from the receptacle 29 the pin 45 moves upwardly to a position where it no longer retains the leaf spring 46 in the position shown in FIG. 11, and thus the end 46a of the leaf spring can now cooperate with the detent notches 43 and will at this time enter the lowermost notch 43 which provides the setting for a distance of 1 meter between the subject and the camera. As is shown in FIG. 2, a manually-engageable ring 47 is fixed to the distance-setting means 41 for turning the latter, and when there is no bulb in the receptacle 29 so that the pin 45 of the rod 33 is displaced to a position out of engagement with the spring 46, the operator can manually turn the setting means 41 to locate a selected notch 43 in engagement with the end 46a of the spring 46 to manually set the distance between the subject and the camera.

When a smaller lamp, such as that shown in FIG. 10, is received in the receptacle 29 the rod 33 is displaced in the direction opposite to that indicated by the arrow y through a lesser distance than that incidated in FIG. 11 so that the extension 40 will not be turned through as large an angle as in the case of FIG. 11, and thus with the smaller lamp a distance setting of, for example, 3 meters will be provided automatically. As is indicated in FIG. 11 the setting provided by the larger lamp, corresponding to that of FIG. 9, is 5 meters, so that the smaller lamp automatically provides a smaller distance setting.

The structure illustrated in FIGS. 11 and 12 also includes an exposure-time setting means 48 which can be manually turned when the operator engages the finger-piece 49 fixed to the rotary exposure-time setting means 48 and accessible to the operator. However, the elongated rod 34 is also capable of determining the angular position of the means 48 so as to determine the exposure time. The exposure time setting means 48 is capable of providing, for example, exposure times of $\frac{1}{30}$ or $\frac{1}{60}$ sec. In the position of the parts shown in FIG. 11 the exposure-time setting means 48 has been positioned by the rod 34 which engages an extension 50 fixed to and extending from the ring 48 so as to cause the springy member 51 to enter at its free end the notch 52 which provides an exposure time of $\frac{1}{30}$ sec. The downward movement of the rod 34 during introduction of the lamp causes the lower end of the rod 34 to engage the extension 50 and turn the latter together with the ring 48 in a direction opposite to that indicated by the arrow Z so as to bring the notch 52 into alignment with the free end of the spring 51 which together with the notches 52 and 53 provides a releasable detent mechanism. When there is no lamp in the receptacle 29 the operator can of course manually turn the ring 48 in the direction of the arrow Z by engaging the finger-piece 49 so as to bring the notch 53 into alignment with the free end of the spring 51, and in this way an exposure time of $\frac{1}{60}$ sec. can be provided. Thus, with this arrangement where the rod 34 will always be displaced to the same position with the bulbs of FIGS. 9 and 10 there will be provided in both cases automatically an exposure time of $\frac{1}{30}$ sec., while of course the distance setting will be different as described above, and it is to be noted that if the exposure time is already set to provide an exposure of $\frac{1}{30}$ sec. the exposure-time setting means 48 will of course not be displaced from this position.

FIG. 11 shows the contact spring 54 which engages the sleeve at the base of the lamp and which is connected by the electrical conductor 55 with one end of a condenser 56 the other end of which is electrically connected with a battery 57 as well as with a conductor 58 which is electrically connected to the ignition switch 59 in the shutter. The other contact of the ignition switch 59 is connected through a conductor 60 with a loading resistance 61 through an electrical conductor 62 in which the resistance 61 is located, and of course the conductor 62 is connected also to the battery 57 as shown in FIG. 11. The conductor 60 is also connected through the conductor 63 with the spring 46 which is carried by a mounting which is electrically insulated and the insulated spring 46 when the lamp is in the receptacle 29 engages the pin 45 which is electrically conductive and which is carried by the electrically conductive rod 33, so that in this way when the shutter in a known way closes the switch 59 the circuit will be completed through the lamp in order to ignite the lamp and create the flash.

Of course, the movable member 3 of FIG. 1 may be connected to an element such as the rod 33 for making an automatic setting of the distance in the manner shown in FIG. 11, or the member 3 may be connected to an element such as the rod 34 so as to automatically set the exposure time when the member 3 of FIG. 1 is depressed, and the same is true of the embodiment of FIG. 2 where the turnable member 4 may have at its underside a camming surface engaging the upper end of a rod such as the rod 34 or the rod 33, so that in this way the embodiments of FIGS. 1 and 2 may make automatic settings. The same applies to the embodiment of FIGS. 4 and 5. The pins 9–11 may be respectively fixed to racks guided for horizontal movement and respectively meshing with gears which turn during shifting of the racks and which are coaxially fixed to cams engaging the upper ends of elements such as the rods 33 and 34, so that the camera may be automatically set with such a construction. Of course, the third element of FIG. 4 can be connected to a rod similar to the rod 34, for example, but cooperating with structure for automatically setting the diaphragm of the camera. Thus, with the embodiment of FIGS. 4 and 5 it is possible to automatically set the diaphragm, the exposure time, and the distance.

It should be noted that although the description above refers to flash lamps of the type which are ignited and replaced after each exposure, the invention is equally applicable to use with electronic flash structures where one lamp is used repeatedly. Moreover, as is apparent from the above description the structure of the invention can be used either with flash assemblies which are removably connected to the camera or with built-in flash assemblies.

It will be understood that each of the elements described above, or two or more together, may also find a useful application in other types of cameras differing from the types described above.

While the invention has been illustrated and described as embodied in flash structures for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having a top face; setting means for setting one of the exposure factors, said setting means arranged in said camera housing and adapted to be in different setting positions corresponding to different values of said exposure determining factors; receiving means in said top face of said camera housing for receiving an illuminating arrangement, said illuminating arrangement insertable into said receiving means by linear movement in an axial direction normal to said top face of said camera housing;

and an actuating member mounted in said camera housing movable also in said axial direction normal to said top face of said camera housing between an inoperative position and an axially spaced operated position and having an actuated portion extending into the path of said illuminating arrangement so as to be moved thereby upon insertion of said illuminating arrangement into said receiving means in said top face of said camera housing from said inoperative to said axially spaced operated position thereof, and having also an actuating portion thereof cooperating with said setting means so as to influence movement of said setting means between said setting positions thereof by movement between said inoperative and operated positions upon insertion of said illuminating arrangement in said receiving upon insertion of said flash arrangement into said receiving means and removal of said illuminating arrangement therefrom, respectively.

2. In a camera according to claim 1, further comprising spring means permanently tending to move said actuating member from said operated into said inoperative position thereof.

3. In a camera according to claim 2 further comprising actuating means amounted on said actuating member, and additional spring means carried by said housing and cooperating with said actuating means and with said setting means for influencing the operation of said setting means.

4. A camera according to claim 3 wherein said additional spring means includes a springy portion movable in a direction transverse to said direction of movement of said actuating member.

5. In a camera according to claim 2, said spring means being mounted at one end on said camera housing and having a portion spaced from said one end and cooperating with said actuating member for permanently biasing said actuating member from said operated into said inoperative position thereof.

6. In a camera according to claim 1, said housing having a partition wall arranged parallel to said top face of said housing and an opening in said partition wall, said receiving means arranged coaxially with said opening and said actuating member being rod-shaped and passing through said opening guided therein.

7. In a camera according to claim 1, said housing having two wall portions spaced from each other and spaced from said top face of said camera housing and each provided with an opening, said openings being aligned in a direction normal to said top face of said camera housing and said actuating member being elongated and passing through and guided in both of said openings.

8. In a camera, in combination, a camera housing having a top face; setting means for setting one of the exposure factors, said setting means arranged in said camera housing and adapted to be in different setting positions corresponding to different values of said exposure determining factors; receiving means in said top face of said camera housing and having a substantially circular opening for receiving an illuminating arrangement, said illuminating arrangement having a substantially cylindrical socket portion insertable into said receiving means by movement in a direction normal to said top face of said camera housing; and an actuating member mounted in said camera housing movable also in a direction normal to said top face of said camera housing and having an actuated portion extending into the path of said illuminating arrangement so as to be moved thereby upon insertion of said illuminating arrangement into said receiving means in said top face of said camera housing, and having also an actuating portion thereof cooperating with said setting means so as to influence movement of said setting means between said setting positions thereof upon insertion of said illuminating arrangement into said receiving means and removal of said illuminating arrangement therefrom, respectively.

9. In a camera according to claim 8 further comprising a laterally extending projection on said cylindrical socket portion of said illuminating arrangement; and engaging means on said housing adapted to engage and hold said illuminating arrangement in inserted position thereof, said illuminating arrangement being detachable from said engaging means by movement relative thereto.

10. In a camera according to claim 1, further comprising a pair of aligned guide opening means spaced from each other and from said top face, said pair of guide opening means being aligned also with said receiving means and adapted to guide said actuating member for axial movement thereof in said direction normal to said top face of said camera housing.

11. In a camera, in combination, a camera housing having a top face; setting means for setting one of the exposure factors, said setting means arranged in said camera housing and adapted to be in different setting positions corresponding to different values of said exposure determining factor; receiving means in said top face of said camera housing for receiving an illuminating arrangement, said illuminating arrangement insertable into said receiving means by movement in a direction normal to said top face of said camera housing; and an operating rod member mounted in said camera housing movable also in a direction normal to said top face of said camera housing and having an actuated portion at its upper end including a laterally extending projection extending into the path of said illuminating arrangement so as to be moved thereby upon insertion of said illuminating arrangement into said receiving means in said top face of said camera housing, and having also an actuating portion thereof cooperating with said setting means so as to influence movement of said setting means between said setting positions thereof upon insertion of said illuminating arrangement into said receiving means and removal of said illuminating arrangement therefrom, respectively.

12. In a camera according to claim 9, said laterally extending projection having an engaging face located substantially parallel to said top face and adapted to engage a corresponding portion of the illuminating arrangement.

13. In a camera according to claim 1, wherein said actuating member is rod-shaped and is movable in response to insertion of an illuminating arrangement into said receiving means between an inoperative position projecting into the path of said illuminating arrangement and an axially spaced operated position, and further comprising spring means permanently tending to move said actuating member from said operated into said inoperative position thereof, and releasable locking means provided on said housing and adapted to engage said illuminating arrangement for holding the same in inserted position thereof against the bias of said spring means.

14. In a camera according to claim 1 wherein said actuating member is rod-shaped and is axially movable in said direction normal to said top face of said camera housing, said housing including guide means for guiding said actuating member for movement in said direction.

15. In a camera according to claim 14 wherein said elongated actuating member has a first end portion constituting said actuated portion and a second end portion spaced from said first end portion, said camera further comprising spring means cooperating with said second end porton for permanently biasing said actuating member in a direction from said second toward said first end portion thereof.

16. In a camera according to claim 15 further comprising second spring means having an end portion mounted on said housing at a location laterally spaced from said elongated actuating member, said second spring means including a springy portion movable in a direction transverse to the direction of movement of said actuating member.

17. In a camera according to claim 16, said actuating portion of said actuating member including lateral projection means, said projection means cooperating with said second spring means for moving said springy portion in said transverse direction in response to axial movement of said actuating member.

18. In a camera according to claim 1 further comprising spring means cooperating with said setting means, said actuating portion comprising actuating means mounted on said actuating member and cooperating with said spring means for influencing operation of said setting means in dependence upon the position of said actuating member.

19. In a camera, in combination, setting means having a plurality of setting positions; actuating means for actuating said setting means and having an actuating portion arranged to normally assume an inactive condition and adapted to be placed into different actuated conditions in each of which said actuating means moves said setting means into a different one of said setting positions thereof; normal operating means for moving said setting means into any desired one of said setting position when said actuating portion of said actuating means is in said inactive condition thereof; receiving means arranged in the region of said actuating portion of said actuating means adapted to receive an illuminating arrangement having an operating portion which, upon insertion of said illuminating arrangement into said receiving means will shift said actuating portion of said actuating means from said inactive condition into a predetermined one of said different actuated conditions depending upon its specific characteristics, whereby said actuating means will cause said setting means to move into the corresponding setting position irrespective of the setting position determined by said manual operating means; and means for automatically returning said actuating portion of said actuating means to said inactive condition thereof upon removal of said illuminating arrangement from said receiving means.

20. In a camera according to claim 18, said actuating portion of said actuating means having an actuated position corresponding to each of said different actuated conditions thereof so that upon insertion of said illuminating arrangement into said receiving means, said operating portion of said illuminating arrangement will engage said actuating portion of said actuating means and depending upon its specific characteristics, move said actuating means from its inactive position into the corresponding actuated position thus moving said setting means into the corresponding setting position, said means for automatically returning said actuating portion of said actuating means to its inactive position including biasing means.

21. An arrangement as set forth in claim 20 wherein said receiving means include receptacle means for receiving an illuminating bulb, said actuating means comprising an elongated rod having an actuating portion extending into said receptacle means and displaced by a bulb inserted into said receptacle means to a position determined by the characteristics of the bulb whereby the camera will be automatically set at least in part by insertion of a bulb into said receptacle means for making a proper exposure with bulb illumination, said arrangement further comprising adapter means received in said receptacle means and carrying a relatively small bulb, said adapter means enabling said small bulbs to be received in said receptacle means while providing no disturbance in the actuation by such a small bulb of said rod for actuating said setting means to provide a setting which is proper for the particular bulb.

22. In a camera-flash-illuminating arrangement, in combination, a camera housing; setting means arranged in said camera housing and having a plurality of setting positions; actuating means for actuating said setting means and having an actuating portion accessible from outside of said camera housing, said actuating portion being arranged to normally assume an inactive position and adapted to be moved into different actuating positions in each of which said actuating means moves said setting means into a different one of said setting positions thereof; manual operating means for moving said setting means into any desired one of said setting position when said actuating portion of said actuating means is in said inactive position thereof; receiving means located on said camera housing in the region of said actuating portion of said actuating means; a set of illuminating arrangements each having an operating portion with different operating characteristics, said illuminating arrangements adapted to be alternatively inserted in said receiving means with the operating portion of the inserted illuminating arrangement engaging said actuating portion of said actuating means and moving the same from said inactive position into a predetermined one of the actuating positions thereof depending upon the particular operating characteristics of the operating means of the respective illuminating arrangement inserted; and biasing means arranged to automatically return said actuting portion of said actuating means to said inactive position thereof upon removal of said illuminating arrangement from said receiving means.

23. In a camera, in combination, a shoe carried by the camera and a foot slidably receivable in said shoe, said foot forming part of an illuminating assembly and being movable with respect to said shoe in a given direction during movement of said foot into said shoe, said shoe being formed with at least one elongated slot extending in said direction and said foot being formed with a control portion located and movable within said shoe; and an elongated movable actuating member having an actuating portion extending through said slot into said shoe to be engaged within said shoe by said control portion so as to be moved to a predetermined position with respect to said shoe when said foot is received therein, said movable actuating member forming part of a means for automatically setting the camera at least in part for making a proper exposure with illuminating illumination.

24. In a camera according to claim 23, said control portion comprising an elongated notch aligned with said slot and also extending in said direction, said actuating member being in the form of an elongated pin extending through said slot to be received in said notch and engaged by an end thereof to be moved to said predetermined position, said pin forming part of said means for automatically setting the camera.

25. In a camera according to claim 24, said foot having a plurality of side edge portions and being formed with a plurality of notches extending inwardly from said side edge portions, respectively, and being of different lengths, and means supporting said foot for turning movement to present a selected notch to said pin for determining the position of the latter in accordance with the selected notch, whereby said pin will be automatically placed in a proper position for making a proper exposure with artificial illumination according to a selected value of a given variable such as where said slots respectively correspond to different types of illuminating bulbs and where the slot presented to said pin corresponds to the particular type of illuminating bulb.

26. In a camera, in combination, a camera housing having a top face; setting means or setting one of the exposure factors, said setting means arranged in said camera housing and adapted to be in different setting positions corresponding to different values of said exposure determining factors; receiving means in said top face of said camera housing for receiving an illuminating arrangement, said illuminating arrangement insertable into said receiving means by movement in a direction normal to said top face of said camera housing; an actuating member mounted in said camera housing movable also in a direction normal to said top face of said camera housing and having an actuated portion extending into the path of said illuminating arrangement so as to be moved thereby upon insertion of said illuminating arrangement into said receiving means in said top face of said camera housing, and having also an actuating portion thereof cooperating with said setting means so as to influence movement of said setting means between said setting positions thereof upon insertion of said illuminating arrangement into said receiving means and removal of said illuminating arrangement therefrom, respectively; spring means cooperating with said setting means; and actuating means mounted on said actuating member and cooperating with said spring means for influencing operation of said setting means in dependence upon the position of said actuating member.

References Cited by the Examiner

UNITED STATES PATENTS

| | | | |
|---|---|---|---|
| 2,749,819 | 6/1956 | Weiss | 95—11.5 |
| 3,005,392 | 10/1961 | Kaden | 95—11.5 |
| 3,051,066 | 8/1962 | Lareau | 95—11.5 |

FOREIGN PATENTS 930,434   7/1955   Germany.

JOHN M. HORAN, *Primary Examiner.*

NORTON ANSHER, *Examiner.*

UNITED STATES PATENT OFFICE
CERTIFICATE OF CORRECTION

Patent No. 3,318,215

May 9, 1967

Albart Schiks

It is certified that error appears in the above identified patent and that said Letters Patent are hereby corrected as shown below:

Column 9, line 15, "flash" should read -- illuminating --.

Signed and sealed this 10th day of March 1970.

(SEAL)
Attest:

Edward M. Fletcher, Jr.
Attesting Officer

WILLIAM E. SCHUYLER, JR.
Commissioner of Patents